United States Patent Office 3,509,886
Patented May 5, 1970

3,509,886
DEVICE FOR REMOVING BRUSSELS SPROUTS FROM THE PLANT
Wilhelmus H. J. Janssen, Wilhelminastraat 1, Herten, Netherlands
Filed Oct. 9, 1967, Ser. No. 673,562
Claims priority, application Netherlands, Jan. 26, 1967, 6701288
Int. Cl. A01f 11/06
U.S. Cl. 130—30      4 Claims

ABSTRACT OF THE DISCLOSURE

A device for removing Brussels sprouts from a stalk comprises a first driven rotatable member having an axial aperture therein, a second rotatable member rotatable about the axis of said first member and having an axial aperture aligned with the aperture in said first member, a plurality of elongated support members mounted on said rotatable members with each elongated member having one end pivotally coupled with one of said rotatable members and the other end pivotally and slidably coupled with the other of said members, cutting knives respectively mounted on said supporting members and disposed about the axis of rotation of said members, and means for braking rotation of the second one of said rotatable members.

---

The invention relates to a device for removing Brussels sprouts from the plant.

A device comprising knives rotating about the stalk for cutting the sprouts from the stalk of Brussels sprout plant is described in German patent specification 1,143,358. This device permits of treating only a limited number of plants.

The sprout plant grows in a great variety of forms: the stalk may be: straight, curved, thick, thin, varying from thin to thick, non-circular of other forms according to circumstances.

The sprouts may have grown in all kinds of arrangements. They may have short or long stems, in a great density on the mother stalk, in loose setting, in helical setting, in a random arrangement; the stalk may be set with thick sprouts, or set with thick sprouts below and thinner sprouts above.

The plants are harvested on the field by cutting the stalks near the ground.

The harvested plants may be in the following forms: with stalks cut obliquely, in wet, humid, or frozen condition.

The present invention provided a device for cutting the sprouts from Brussels sprout plants in an undamaged state; it being found that this device permits of collecting approximately 100% of the sprouts.

The machine comprises automatically setting, feeling chisel members adapted to rotate about a centre line along which the stalk of the plant can be moved for cutting the sprouts from the stalk. The stalk may be moved along said centre line by hand or mechanically.

It has been found that in order to achieve said purpose it is necessary (a) to center and to keep firmly centered the stalk during the cutting operation with respect to the centre of the interrupted ring of chisels; (b) to cause these chisels to follow accurately the thickness of the stalk, whilst the stalk is kept centered; (c) to scan the thickness of the stalk at the place of cutting of the chisels so that the sprouts are anywhere removed closely along the stalk of the plant, whilst the stalk is kept centered.

An embodiment of the invention will now be described more fully with reference to the accompanying diagrammatic drawings.

Figure 1:
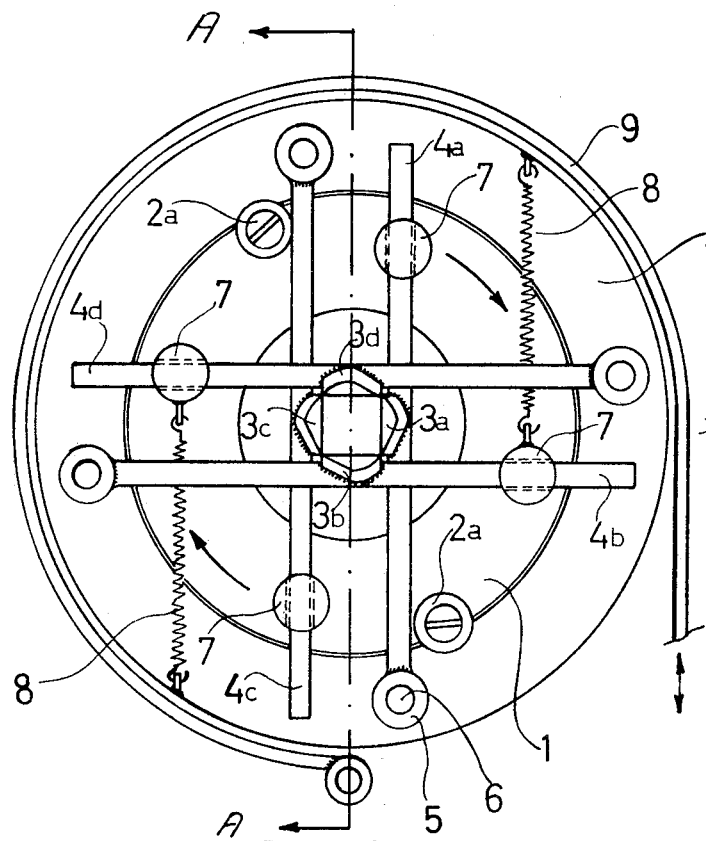
FIG. 1 is a front view of the construction according to the invention.
Figure 2:
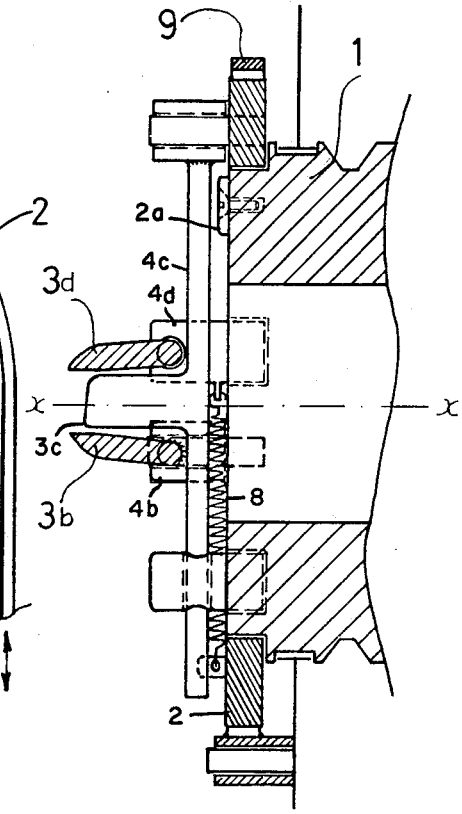
FIG. 2 is a side elevation of a cross section taken on the line A—A of FIG. 1.
Figure 3:
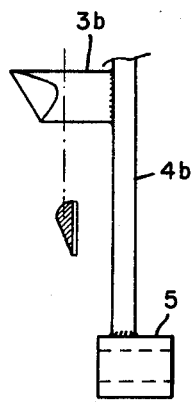
FIG. 3 shows the shape of the two foremost feeling chisels.

The device comprises a hub 1, which is journalled on the rear side and is driven in the direction of the arrow. The front side of said hub is provided with a shoulder, around which the annular plate 2 is adapted to rotate. This plate is enclosed by the discs 2a. Both the annular plate 2 and the hub 1 are provided with a cutting member.

The cutting member comprises four feeling chisels 3a, 3b, 3c, 3d of equal lengths and secured each to an arm 4a, 4b, 4c, and 4d. The portion of each arm located opposite the cutting edge of the feeling chisel secured to the arm is provided with a sleeve 5, arranged approximately in the longitudinal direction of the chisel. This sleeve is adapted to rotate about a shaft 6, secured to the annular plate 2. The annular plate 2 has therefor four shafts, each having an arm and a chisel. The centres of these shafts are located at the corners of an imaginary square.

The other side of each arm 4a, 4b, 4c and 4d is adapted to slide in an opening pierced through pins 7. The pins 7 are rotatably secured in the hub 1. This hub therefore comprises four rotatable pins so that the centres of the pins are again located at the corners of an imaginary square.

The centres of these imaginary squares coincide with the centres of the hub 1 and of the annular plate 2.

The arms are secured to the sleeves 5 so that the parallel arms 4a and 4c are spaced from the parts 1 and 2 by equal distances. The arms 4b and 4d, also spaced apart equally from the parts 1 and 2 are located in front of the arms 4a and 4c and cross the latter at an angle of 90°.

To the two opposite shafts 7 is secured one end of the tensile spring 8, the other end of which is secured to the annular plate 2 so that by means of these two springs the group of feeling chisels join each other.

The group of feeling chisels forms a ring the centre of which is formed by the centres of parts 1 and 2.

When the hub 1 is driven in a clockwise direction as viewed in FIG. 1 the springs 8 will cause the annular plate 2 to rotate in the same direction. When the annular plate 2 is braked by means of a braking strap 9 surrounding said plate the shafts 6 and the pins 7 will move away from each other and by the arms moving therewith the feeling chisels secured thereto will form a larger interrupted rotating ring. Rotatable member 1 may be driven by any suitable motive means which is directly connected to element 1 or through gear means if desired.

As soon as the arms 4 come into contact with the shafts 7 moving towards them the interrupted ring formed by the feeling chisels has its maximum size. During the enlargement and the reduction of the diameter of said ring its centre remains accurately at the centre of the parts 1 and 2.

It will now be described how this machine removes the sprouts from the Brussels sprout plants.

When the braking strap 8 is slightly tightened around the rotating annular plate 2, as by manually tensioning the brake element 9 or by means of any suitable force applying device, the feeling chisels move outwardly somewhat to define an opening large enough to receive a Brussel sprout plant.

The sprout plants can now be inserted by the lower end of the stalk without roots, and with or without upper leaves into the centre of the rotating ring of feeling chisels.

When the braking strap is loosened by relieving the degree of tension thereon manually or otherwise, the annular plate 2 will be turned by means of the springs 8 with respect to the hub 1 so that the points of rotation 6 approach the points of rotation 7 until the feeling chisels engage the stalk all around.

The feeling chisels 3 are secured to the arms 4 so that their ends are orientated slightly obliquely towards the centre line X—X.

The inner sides of the ends of the feeling chisels will therefore cut the stems of the sprouts exactly at the place where they engage the stalk. These feeling chisels will invariably center the stalk accurately so that they remove the further sprouts whilst the stalk is moved along the line X—X.

Figure 4:
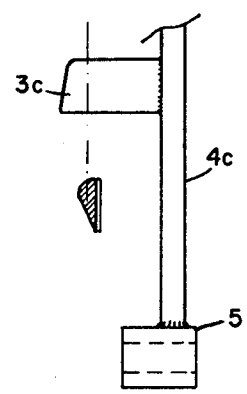
FIG. 4 shows the shape of the two hindmost feeling chisels.

Cutting is performed by two opposite chisels 3b and 3d, which project beyond the feeling chisels 3a and 3c and which are ground as is shown in FIG. 4.

When the stalk has been passed completely, the sprouts are removed from the stalk and collected for example in a box.

Then the feeling chisels return to their initial state under the action of the springs 8.

The device may operate in a horizontal as well as in a vertical position.

I claim:

1. A device for removing Brussels sprouts from a stalk comprising a rotatable driven member having an aperture located axially therein, a second rotatable member rotatable about the axis of rotation of said driven member and provided with an aperture aligned with the aperture in said rotatable driven member, a plurality of elongated support members each having one end pivotally coupled with one of said rotatable members and the other end pivotally and slidably coupled with the other of said rotatable members, cutting knives respectively mounted on said supporting members and disposed about said axis, spring means interconnected between said rotatable members to accommodate relative rotation thereof, and means for braking rotation of said second rotatable member.

2. A device as claimed in claim 1, wherein said second rotatable member is rotatably supported by said driven rotatable member.

3. A device as claimed in claim 1, wherein four supporting members are provided, and are pivotally coupled with the rotatable members by means of pivot pins, the pivot pins of each of the rotatable members being located at the corners of an imaginary square from which the center coincides with said axis of rotation.

4. A device as claimed in claim 3, wherein spring means are arranged so as to tend to maintain the supporting members in such positions that the supporting members are arranged in pairs with each member of each pair disposed in approximately parallel relation to the other member.

References Cited

UNITED STATES PATENTS

| 2,017,931 | 10/1935 | Wheeler | 130—9.2 |
|---|---|---|---|
| 3,175,561 | 3/1965 | Oldershaw | 130—30 |
| 3,203,427 | 8/1965 | Urschel | 130—9.2 |
| 3,252,463 | 5/1966 | Alpen | 130—30 |

ANTONIO F. GUIDA, Primary Examiner

U.S. Cl. X.R.

130—5